UNITED STATES PATENT OFFICE.

SAMUEL PRESTON, OF RAMSGATE, COUNTY OF KENT, ENGLAND.

BREAD.

SPECIFICATION forming part of Letters Patent No. 393,923, dated December 4, 1888.

Application filed April 30, 1888. Serial No. 272,526. (No specimens.) Patented in England May 1, 1886, No. 5,946.

*To all whom it may concern:*

Be it known that I, SAMUEL PRESTON, of Ramsgate, in the county of Kent, England, have invented a new and useful Improvement in the Manufacture of Bread, (for which I have obtained a patent in Great Britain, No. 5,946, dated the 1st day of May, 1886,) of which the following is a specification.

My invention relates to improvements in the manufacture of bread, the object of the invention being to render the bread more nutritious and agreeable to the palate and less liable to induce constipation than bread made in the ordinary manner.

In carrying out my invention I manufacture my improved bread from a mixture or compound of wheaten flour, (whole meal or any part of whole meal,) lentil-flour, and sweet-almond oil, in about the following proportions, videlicet: I take the lentil-flour and sweet-almond oil in the proportions of about one and a-half pounds of lentil-flour to one stone of wheaten flour and one ounce of sweet-almond oil.

The above proportions are those which I have found to give good results; but it will be obvious that they may be somewhat varied. In manufacturing my improved bread I set the sponge for common bread in the usual way. When the sponge is ready, I add the salt and water and well break it up. I next add the lentil-flour and sweet-almond oil and thoroughly mix it. I then make it into dough in the usual way. When risen it is then fit for baking.

What I desire to claim and secure by Letters Patent is—

The improved bread herein described—that is to say, bread composed of wheaten flour, whole-meal flour, lentil-flour, and sweet-almond oil—substantially as described.

SAMUEL PRESTON.

Witnesses:
  NATHANIEL BROOKS,
*Book-Binder, 99 High St., Ramsgate.*
  WALLACE ROBINS,
*Baker, 103 King St., Ramsgate.*